(12) United States Patent
Dees (10) Patent No.: US 10,654,396 B2
(45) Date of Patent: May 19, 2020

(54) MOTORCYCLE CARRIER WITH RETRACTABLE WHEELS

(71) Applicant: James D Dees, Phoenix, AZ (US)

(72) Inventor: James D Dees, Phoenix, AZ (US)

( * ) Notice: Subject to any disclaimer, the term of this patent is extended or adjusted under 35 U.S.C. 154(b) by 0 days.

(21) Appl. No.: 16/114,136

(22) Filed: Aug. 27, 2018

(65) Prior Publication Data
US 2018/0361903 A1 Dec. 20, 2018

Related U.S. Application Data

(63) Continuation-in-part of application No. 15/485,187, filed on Apr. 11, 2017, now abandoned.

(60) Provisional application No. 62/321,162, filed on Apr. 11, 2016.

(51) Int. Cl.
| | | |
|---|---|---|
| *B60P 3/07* | (2006.01) | |
| *B60P 3/077* | (2006.01) | |
| *B60P 1/64* | (2006.01) | |
| *B60P 1/43* | (2006.01) | |
| *B62B 3/00* | (2006.01) | |
| *B62B 5/00* | (2006.01) | |
| *B62B 3/04* | (2006.01) | |
| *B62B 3/10* | (2006.01) | |
| *B60P 1/36* | (2006.01) | |
| *B60P 3/12* | (2006.01) | |

(52) U.S. Cl.
CPC ............ *B60P 3/077* (2013.01); *B60P 1/43* (2013.01); *B60P 1/6409* (2013.01); *B60P 3/07* (2013.01); *B62B 3/008* (2013.01); *B62B 3/04* (2013.01); *B62B 3/10* (2013.01); *B62B 5/0003* (2013.01); *B62B 5/0093* (2013.01); *B60P 1/36* (2013.01); *B60P 3/122* (2013.01); *B62B 2202/90* (2013.01)

(58) Field of Classification Search
None
See application file for complete search history.

(56) References Cited

U.S. PATENT DOCUMENTS

| | | | | |
|---|---|---|---|---|
| 2,446,518 | A * | 8/1948 | Arnold | B62B 3/10 248/129 |
| 3,822,798 | A * | 7/1974 | Neff | B60P 3/06 280/763.1 |
| 5,016,893 | A * | 5/1991 | Hart, Jr. | B62B 3/10 211/195 |
| 5,133,453 | A * | 7/1992 | Fritze | B65D 19/44 206/335 |
| 6,102,645 | A * | 8/2000 | Kooima | B62B 5/0083 280/47.29 |
| 7,021,461 | B1 * | 4/2006 | Robey | B60P 3/07 206/335 |

(Continued)

OTHER PUBLICATIONS

STI ramped skid, online as of Apr. 10, 2016. (Year: 2016).*

*Primary Examiner* — Mark C Hageman
(74) *Attorney, Agent, or Firm* — Paul B. Heynssens, Attorney at Law, PLC (57) ABSTRACT

A motorcycle carrier with retractable wheels. The present example provides a motorcycle carrier with retractable wheels (carrier) is a structure that allows a motorcycle to be parked on it and secured safely, typically during shipping or storage. The carrier may include wheels that may be extended to aid in moving a motorcycle stored on the carrier. The wheels may be retracted when the motorcycle is no longer being moved. When secured the carrier may also function as a work stand.

16 Claims, 11 Drawing Sheets

(56) References Cited

U.S. PATENT DOCUMENTS

| | | | | |
|---|---|---|---|---|
| 7,033,119 B2* | 4/2006 | Baker | ........................ | B60P 3/06 |
| | | | | 410/30 |
| 7,325,816 B2* | 2/2008 | Johnson | .................. | B60S 13/00 |
| | | | | 211/20 |
| 7,641,235 B1* | 1/2010 | Anduss | ..................... | B60R 9/06 |
| | | | | 224/509 |
| 8,777,544 B1* | 7/2014 | Carpenter | .............. | B65D 85/68 |
| | | | | 414/430 |
| 9,499,378 B2* | 11/2016 | Kelly | ........................ | B66F 7/10 |
| 9,714,585 B2* | 7/2017 | Morey | ....................... | B62B 3/02 |
| 2002/0119035 A1* | 8/2002 | Hamilton | ................ | B60P 3/125 |
| | | | | 414/426 |
| 2016/0272229 A1* | 9/2016 | Buckner | ................... | B62B 3/02 |

\* cited by examiner

MOTORCYCLE CARRIER WITH RETRACTABLE WHEELS

CROSS-REFERENCE TO RELATED APPLICATION(S)

This application is a continuation in part of U.S. patent application Ser. No. 15/485,187 filed Apr. 11, 2017, which in turn claims the benefit of U.S. Provisional Patent Application No. 62/321,162 filed Apr. 11, 2017, the contents of which are all hereby incorporated by reference.

TECHNICAL FIELD

This description relates generally to transport carriers and more specifically to those for shipping or transporting motorcycles.

BACKGROUND

Transporting two wheeled vehicles such as motorcycles can be difficult. It can be difficult to keep then upright and undamaged during transport. Also moving a heavy object on two wheels can be a challenge when it is unpowered. One faces the combined difficulties of moving dead weight that may only be being kept in an upright position by a kick, or center stand. It would be desirable to have a device that keeps a motorcycle upright for transport and tends to protect it from damage. Also such a device would advantageously allow the motorcycle frame combination to be easily moved, and loaded onto transport.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides a motorcycle carrier with retractable wheels (carrier) is a structure that allows a motorcycle to be parked on it and secured safely, typically during shipping or storage. The carrier may include wheels that may be extended to aid in moving a motorcycle stored on the carrier. The wheels may be retracted when the motorcycle is no longer being moved. When secured the carrier may also function as a work stand.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The examples below describe a motorcycle carrier. This is a description of a motorcycle carrier (or equivalently "pallet" or simply "carrier") which is used for the safe and secure transportation of a motorcycle or other objects which need to be secured for moving. Although the present examples are described and illustrated herein as being implemented for use in a trucking system, the system described is provided as an example and not a limitation. As those skilled in the art will appreciate, the present examples of motorcycle carriers are suitable for application in a variety of different types of transport systems.

The motorcycle carrier with retractable wheels ("carrier") is a structure that allows a motorcycle to be parked on it and secured safely, typically during shipping or storage. The carrier may include wheels that may be extended to aid in moving a motorcycle stored on the carrier. The wheels may be retracted when the motorcycle is no longer being moved. When secured the carrier may also function as a work stand.

In alternative examples provisions for the use of hooks and additional securement locations may be provided.

Before loading on a truck, the motorcycle is pushed or driven onto the pallet and secured in place with straps or the like. Next the pallet is elevated onto its wheels by cranking them down, or otherwise causing them to be extended. Now the motorcycle and carrier are on wheels, and may easily be loaded (by rolling) onto a tow truck or flatbed truck. During shipping the carrier typically sits flat on the truck bed with the wheels withdrawn. Once loaded or otherwise located, the wheels are retracted to keep the carrier and motorcycle in place. A motorcycle loaded onto a carrier may be transported in a variety of convenient ways.

Figure 1:
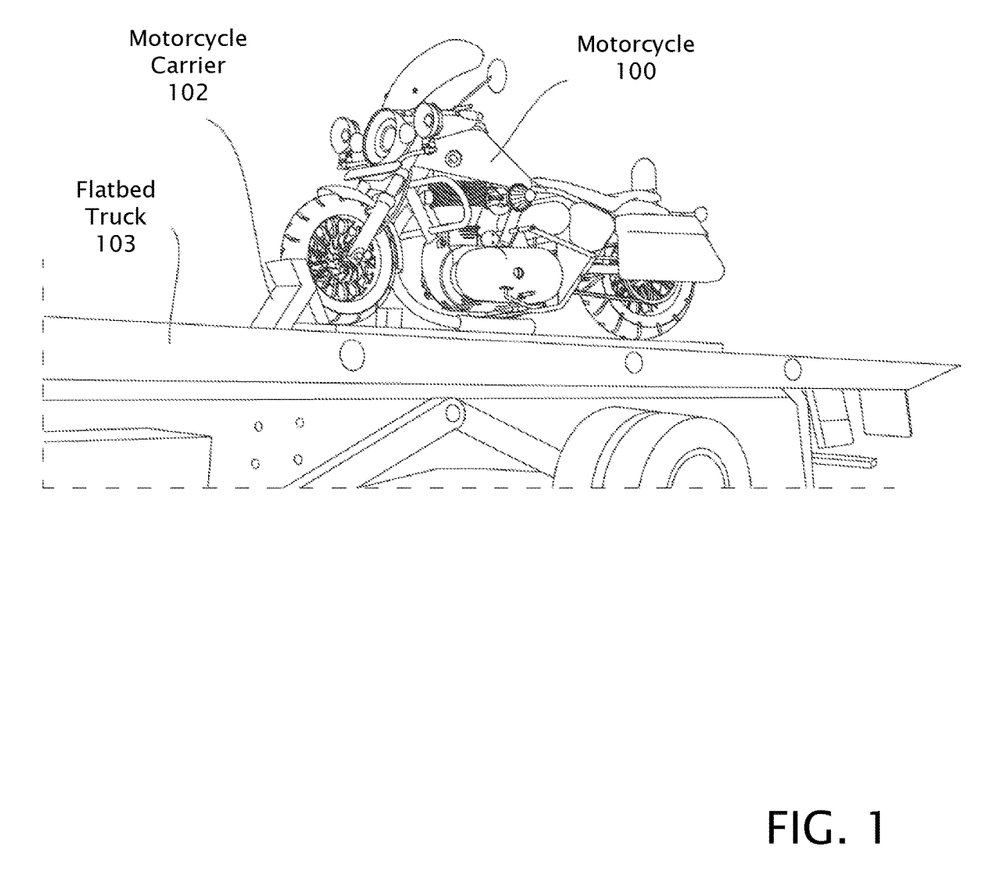
FIG. 1 shows the motorcycle carrier with retractable wheels supporting a motorcycle being transported by a flatbed truck.

FIG. 1 shows the motorcycle carrier with retractable wheels 102 supporting a motorcycle 100 being transported by a flatbed truck 103.

Figure 2:
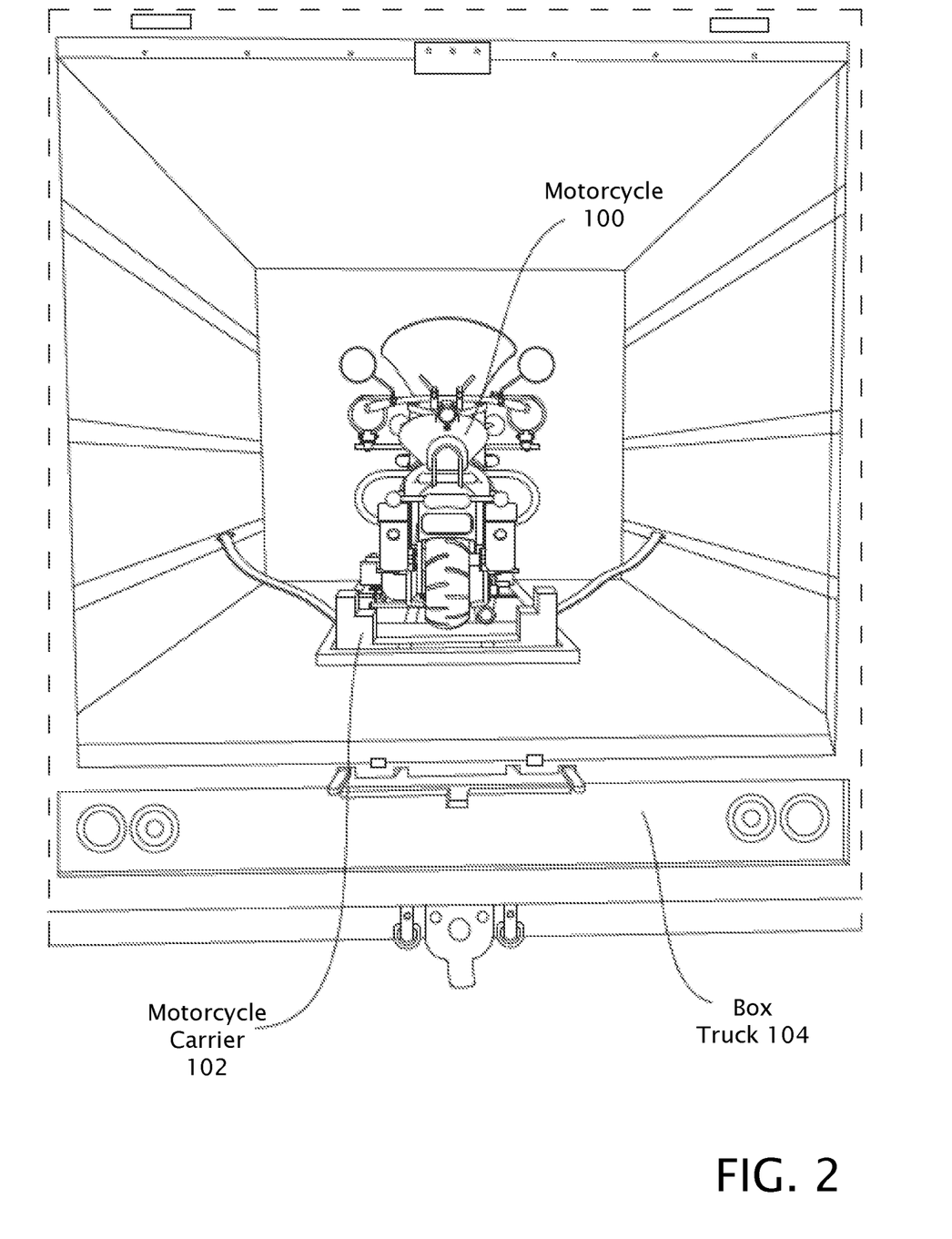
FIG. 2 shows the motorcycle carrier with retractable wheels supporting a motorcycle being transported in a box truck

FIG. 2 shows the motorcycle carrier with retractable wheels 102 supporting a motorcycle 100 being transported in a box truck 104.

Figure 3:
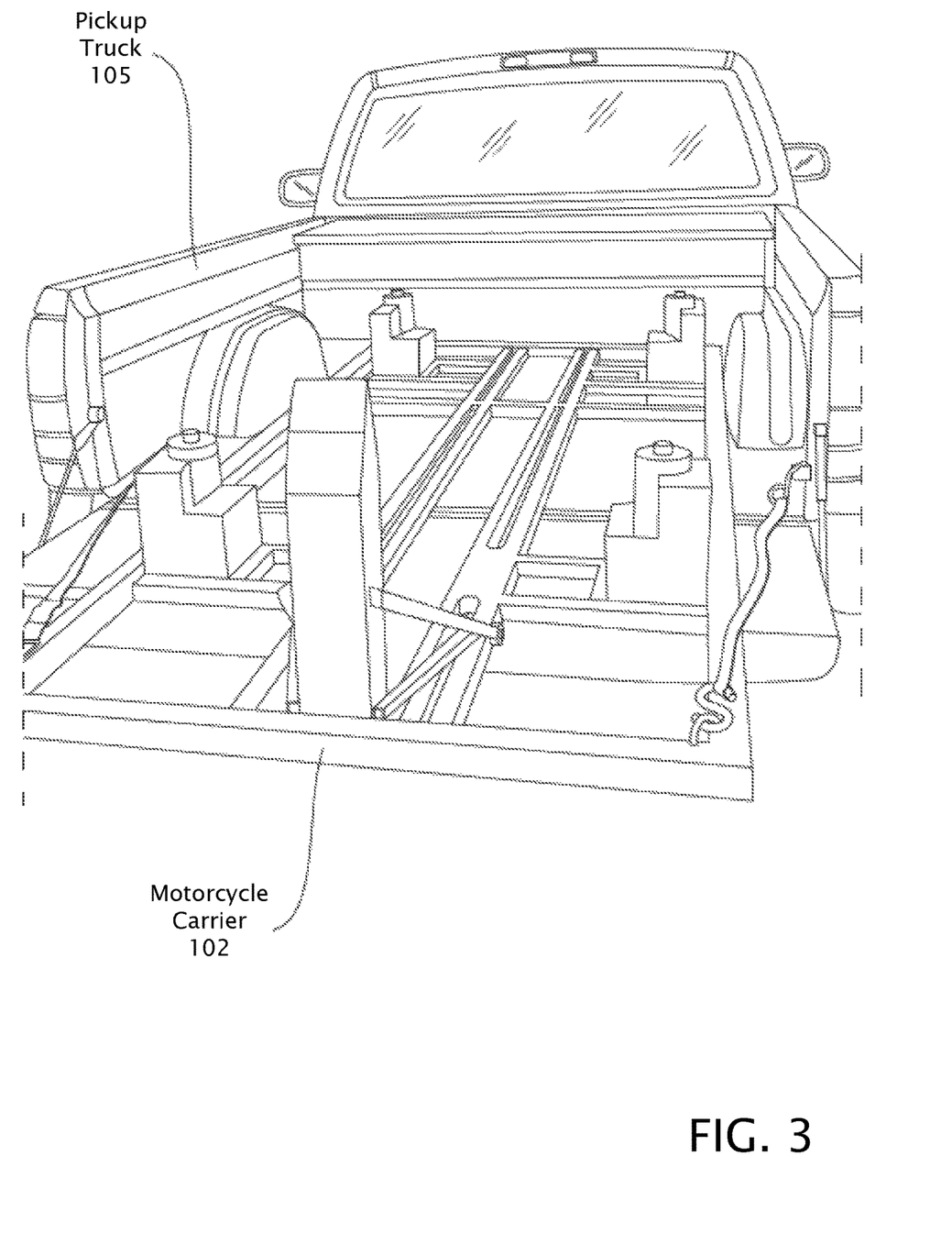
FIG. 3 shows the motorcycle carrier with retractable wheels in a pickup truck.

FIG. 3 shows the motorcycle carrier with retractable wheels 102 in a pickup truck 105. FIGS. 1-3 show that the motorcycle carrier may advantageously be used with a number of vehicles. THE examples of motorcycle carrier shown in FIGS. 2-3 show vertically retractable wheels utilizing a crank mechanism that continuously extends or retracts the wheels. When extending the wheels the crank is typically turned until a mechanical hard stop is reached so that the wheels all extend for the same length.

Figure 4:
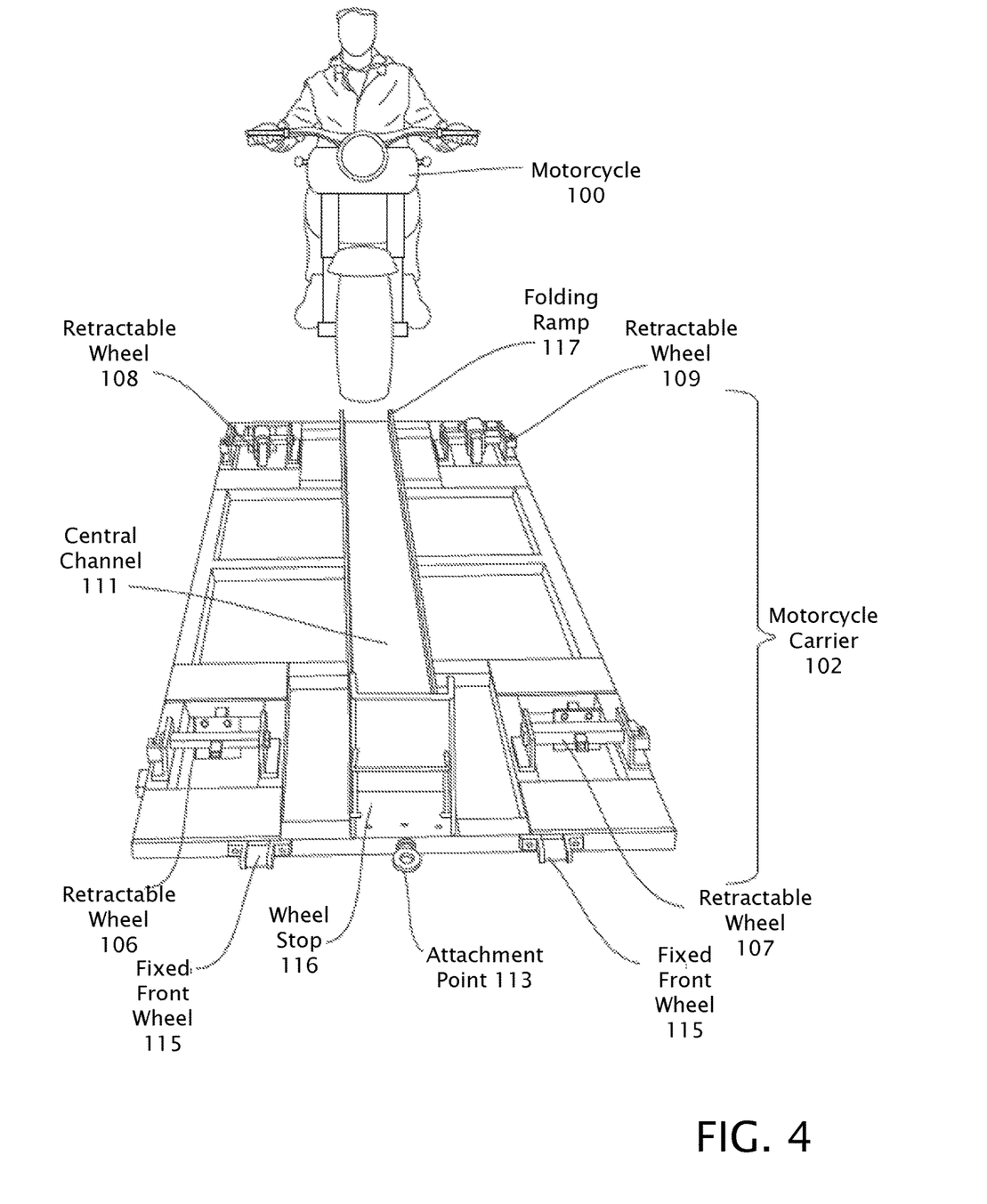
FIG. 4 shows a motorcycle being driven onto the motorcycle carrier with retractable wheels so that it may be secured for transport.

FIG. 4 shows a motorcycle 100 being driven onto the motorcycle carrier with retractable wheels 102 so that it may next be secured for transport. This pallet 102 may also be used by trucking companies, or the like for moving a disabled motorcycle to a shop, or for simply shipping it to a destination. Moving bikes from a dock to a trailer is easy, as the wheels are retracted for safe shipping with the bike strapped into place.

First the motorcycle is driven onto the carrier (with its wheels 106, 107, 108, 109 retracted so the carrier does not move) and then secured. THE motorcycle is driven up the folding ramp 117, with its wheels being guided by a trough like channel 110, to center it on the carrier. The channel 111 has a flat bottom and vertical walls to keep the wheels in place. THE front motorcycle wheel rests against a front wheel stop 116, that also has a flat bottom and vertical walls to keep the front wheel in place. The width of the center channel 111 is sufficient to accommodate a variety of motorcycle tire widths without the tires rubbing against the walls, but narrow enough to keep the motorcycle centered on the carrier 102.

After the motorcycle is secured the carrier wheels 106, 107, 108, 109 may be lowered to assist in moving the carrier/motorcycle combination, such as when loading it onto a truck by rolling the carrier motorcycle combination on the ground, and up a ramp or the like. Once the motorcycle and palate are placed on a tow vehicle, the wheels are retracted, so the pallet frame rests on the truck bed, and will not roll or slide.

Then the pallet and motorcycle may be further strapped down to the truck bed for safety during transit. Eyelets or the like may be supplied at various attachment points such as the exemplary attachment point 113 to allow securement to the transport vehicle.

The carrier 102 advantageously utilizes a folding ramp 117 to help get the bike onto the carrier 102, and a wheel stop 116 to prevent the bike from going any farther past the front of the ramp. Note that the central channel 111 is flat through the length of the carrier, with vertical sides to prevent the motorcycle from slipping out of the channel 111. The channel 111 is made narrow to guide the motorcycle to the center of the carrier 102, with it being a small amount wider than a typical motorcycle tire so as not to bind against the tires when loading the motorcycle.

Figure 5:
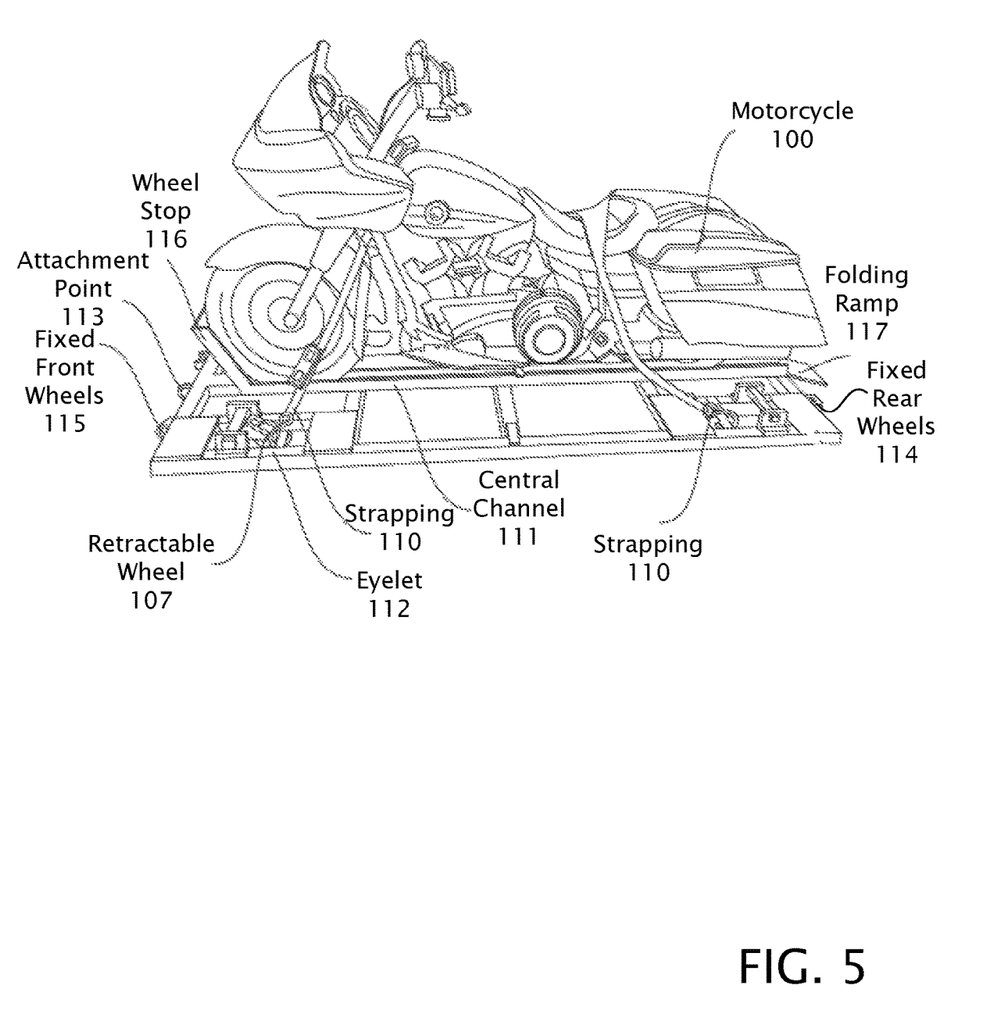
FIG. 5 shows a motorcycle secured to the motorcycle carrier with retractable wheels prior to loading onto a vehicle for transport.

FIG. 5 shows a motorcycle 100 secured to the motorcycle carrier with retractable wheels 102 prior to loading onto a vehicle for transport. Strapping 110 or other hold-downs may be used to steady the motorcycle whose wheels rest in a central channel 111. The straps 110 typically attach to eyelets 112 or equivalent on the carrier. Here the wheels are retracted so that the motorcycle does not roll while it is being prepared for shipment.

Figure 6:
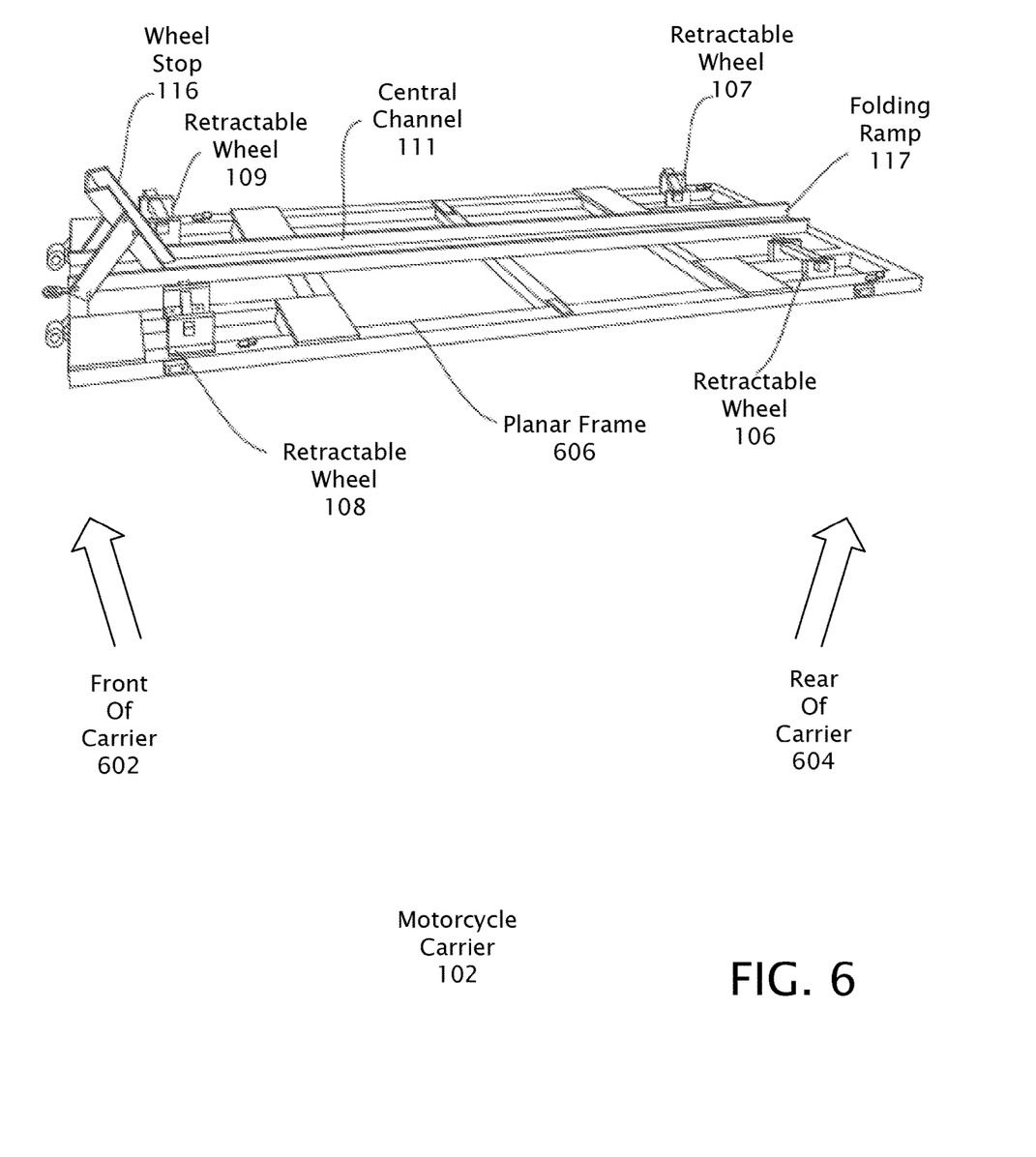
FIG. 6 shows a side view of the motorcycle carrier with retractable wheels, with the wheels deployed so that the carrier will roll.

The unit may also be moved by lifting the front of the rack via attachment points provided 113, and rolled on rear wheels 114 which are horizontally mounted on the frame and do not contact the ground when the carrier rests on the ground. Likewise, front wheels 115 may be provided when lifting from the rear. Front wheels 115 also assist the carrier as it advances up a ramp, since the front wheels 115 will first engage the ramp until the carrier is advanced far enough up the ramp for the bottom front wheels 107 and 102 (not visible in FIG. 5) to engage the ramp. Such an arrangement would typically be useful in winching the motorcycle and carrier up a ramp into a truck bed, or the like FIG. 6 shows a side view of the motorcycle carrier 102 with retractable wheels 106, 107, 108, 109, with the wheels deployed so that the carrier will roll. As shown the wheels are generally at the four corners of the planar frame 606, and function independently as they may each be raised or lowered independently, and are not mechanically coupled via an axle or the like. The wheels are of the caster type and may rotate freely about their pivot point (for 360 degrees) when extended.

The carrier 102 has a central channel 111 with a stop 116 at one end 602, and a ramp at the opposite end 604, that are mounted on a planar frame 606. The opposite end of the channel has a foldable ramp (shown folded into the channel 111) to aid in driving the motorcycle onto the ramp. Placements of openings in the carrier frame facilitate loading the motorcycle as the kickstand can be lowered until the motorcycle is secured, when it is then retracted. Also the positioning of the openings allow a person to sit on the motorcycle and move it about by allowing their feet to push against the ground, rather that pushing the motorcycle/carrier combination.

Figure 7:
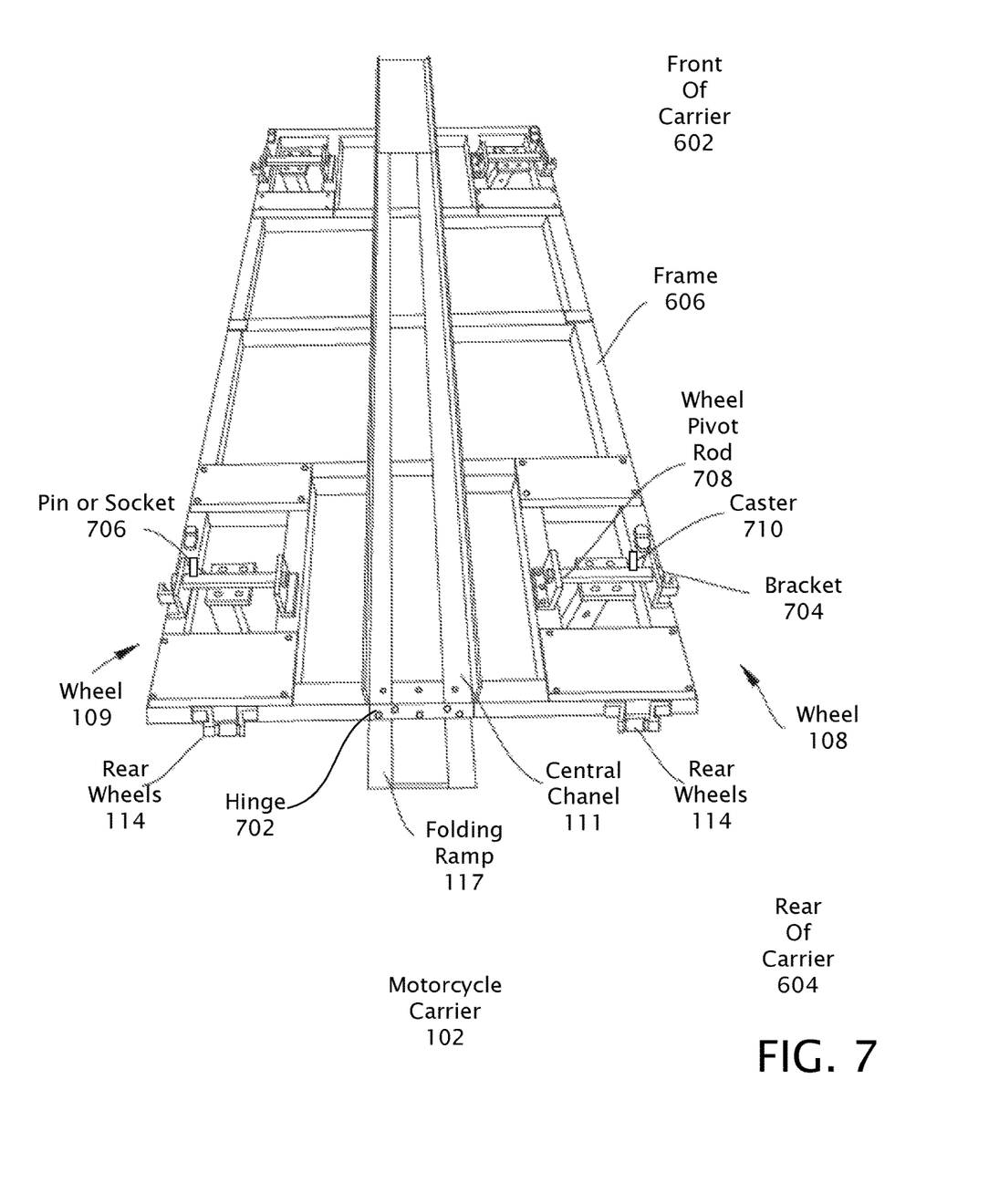
FIG. 7 is an end view of the motorcycle carrier with retractable wheels, as seen from the end where a motorcycle would enter the carrier.

FIG. 7 is an end view of the motorcycle carrier with retractable wheels 102, as seen from the rear of the carrier 604 where a motorcycle would enter the carrier. In this view the folding ramp 117 is seen. The folding ramp has a width less than that of the central channel and folds via an exemplary hinge 702, Also the wheels are extended so that the empty rack may be rolled around. In this view it details of the wheel mountings may be seen, in particularly with respect to wheels 108 and 109. All four independent wheels are similarly constructed. A rectangular opening is formed in the four corners of the frame 606, into which the caster wheels 710 are disposed. The casters are fixedly mounted to a rod 708 transverse to the opening, and there is sufficient room in the opening for the caster to turn freely without interference from the frame. The rod 708 is parallel to the short width of the rectangular frame 606, and includes a socket (or equivalently a knob) to which a handle or lever may be attached or inserted so that the rod 708 may be rotated to raise or lower the caster. The rod ends are disposed in a pair of mounting brackets attached to the frame.

When the rod is rotated such that the wheels are in a downward position (contacting the floor for rolling the carrier) they may be locked in place via a plate (1004 of FIG. 10) with an aperture may be attached to the rod 708 that is positioned such that when the wheel is rotated down a pin (1002 of FIG. 10) may be inserted through the aperture into an aperture in the frame, or mounting bracket to keep the wheel in a downward position. As will be realized by those skilled in the art the pin may be captive to the frame 606, or removable. In addition, the pin may be captive and under spring bias. In such an arrangement when the caster is retracted the pin rests against the plate, and when the caster is extended the spring pushes the pin into the mounting bracket aperture when it is encountered. A knob or protrusion on the pin allows it to be pulled out when releasing the caster for retraction.

Alternatively, when the rod is rotated such that the wheels are in a downward position (contacting the floor for rolling the carrier) they may be locked in place by a standard detent or by other methods known to those skilled in the art to keep them in a downward position while in use.

Figure 8:
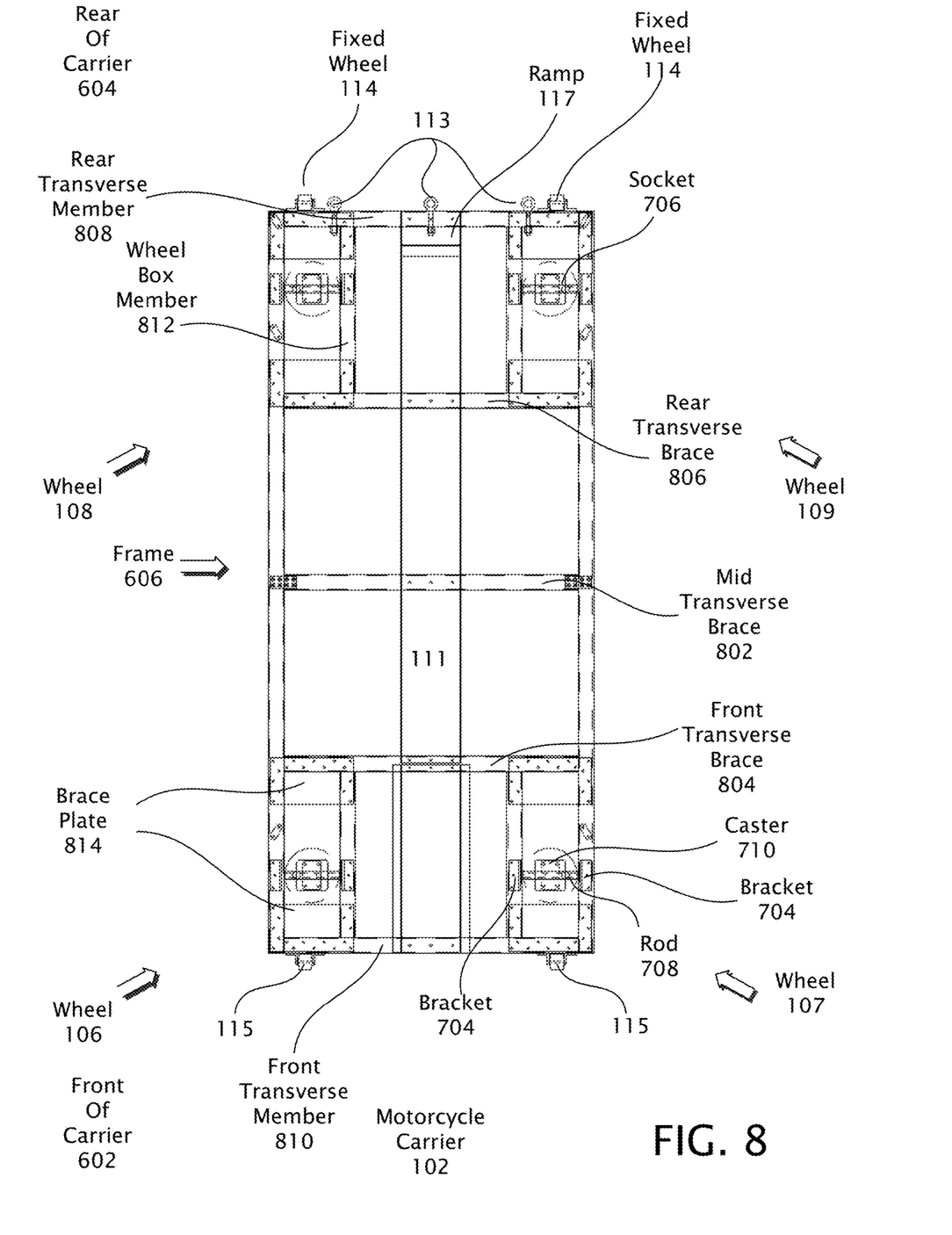
FIG. 8 is a line drawing of the motorcycle carrier with retractable wheels as viewed from the top.

FIG. 8 is a line drawing of the motorcycle carrier with retractable wheels as viewed from the top. The pallet 102 is generally rectangular in form of its frame 606. TO support a motorcycle a central channel 111 is attached to the top of the frame and supported by transverse cross members 806, 802, 804 approximately equally spaced along the length of the carrier 102.

The wheels are supported in a rectangular frame formed by the wheel box member 812 extending from the front transverse brace 804, or the rear transverse brace 806 to the exterior frame. The wheels are also strengthened by brace plates 814 attached to and covering the ends of the rectangular opening formed by the rectangular wheel frame.

Across the wheel frame is a rod 704, coupled to the frame via mounting brackets 704. The rod may include a socket 706 to which a lever may be attached to raise or lower the wheels. The casters are fixedly coupled to the rod 708, and are free to rotate 360 degrees, This is a basic design of a light weight metal rectangle built with braces to eliminate flexing size can vary to use. The wheels retract so that the pallet is completely flat on the ground and easy to load motorcycles and materials without the pallet rolling beneath. Once a motorcycle, any other item is loaded onto the pallet, it can be secured using the multiple securement locations (D-rings, hooks, loops, etc.).

Near each of the 4 corners is 1 fully rotatable wheel which can be extended independently to elevate the pallet above the ground. The lift height can be altered on different pallets as needed by the demands of the customer. These wheels are heavy duty caster type wheels. They retract individually when the pallet needs to be on the ground, and are used when the pallet needs to be moved. A motorcycle that is on a pallet can then be pushed, pullet, towed, or winched. The pallet is also good for transporting machinery or other items.

The pallet is roughly 2 pallets in size but can vary greatly depending on the customer. The average pallet is 40-42 inches×48 inches. Accordingly the pallet can be roughly 40×96 inches, as needs dictate. The importance is in sizing it to maintain the lateral stability and keeping enough width so that the pallet will not tip over, and also wide enough that a motorcycle may have straps (tie downs) to many locations on the pallet. Securing the motorcycle and eliminating the risk of motorcycle damage during shipping.

The front and rear of the pallet has tow hooks, and eyes 113, making towing with a cable hook, or chain an easy process. Also on the leading and following edges of the pallet are rollers 114, 115 which will hit the angle of a ramp or other obstruction in front or behind the pallet, to keep the metal from dragging on the ground. The rollers are especially handy when using a roll back tow truck. The angle of the bed in relation to the ground would normally have metal to the ground, not the entire system rolls on wheels for easy rolling during loading and unloading.

The frame itself at this time is rectangular in shape, and is made as light weight as possible using aluminum. The current model is built with square tubing, yet there is no reason that I-beam, angle iron, round tubing and other shapes cannot be used so long as the unit won't flex when tightly strapped and during loading/unloading and in transit. Safety of the secured item is the main concern.

The frame may be built of lightweight aluminum or equivalent material, so that it is easy to transport, and easy to store. The carrier frame is typically rectangular, but may be made in any convenient shape to keep the motorcycle upright and protected. The exemplary carrier shown herein in the attached pictures is 40×96 inches. However various sizes for different sized motorcycles may be constructed. Typically in a center portion of the carrier support mechanism is provided to keep the motorcycle upright and secured. The motorcycle is typically driven or pushed onto the carrier, where it is then secured to the carrier by straps, cords or the like. To aid in driving on, a ramp or other aid may optionally be provided. And to prevent the motor cycle from going too far a bump stop chock may also be provided. Such a chock may also be removable, and may also help keep the motorcycle upright.

Figure 9:
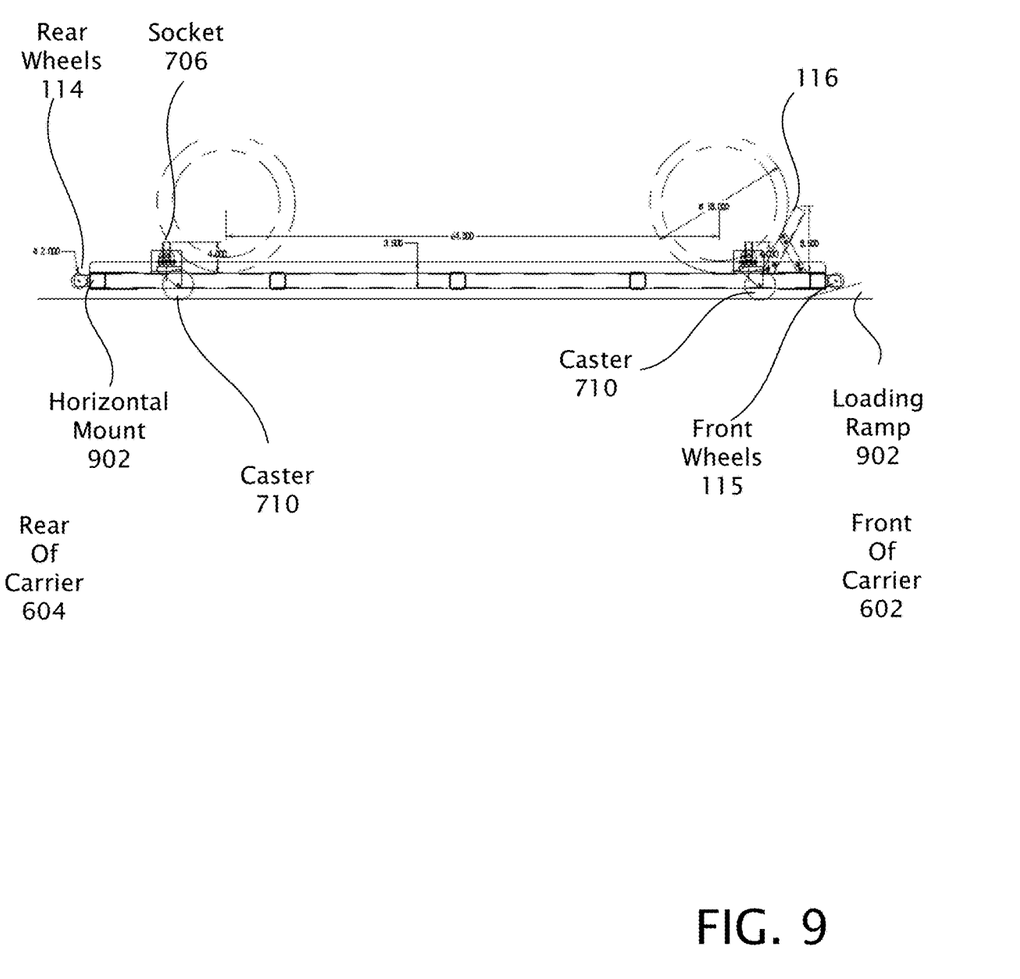
FIG. 9 is a line drawing of the motorcycle carrier with retractable wheels as viewed from the side.

FIG. 9 is a line drawing of the motorcycle carrier with retractable wheels as viewed from the side. As can be seen front and rear wheels 114, 116 are mounted horizontally to the frame 902. As the carrier is pushed up a loading ramp 902 the wheels 115 may encounter the ramp first and roll against it to prevent the carrier from hanging on the ramp as it is pushed up the ramp. Once the casters are far enough up the ramp they contact the ramp taking the load off of the front wheels. The rear wheels 114 likewise come into contact with the pavement and roll against it as the ramp advances and the rear casters loose contact with the ground.

Figure 10:
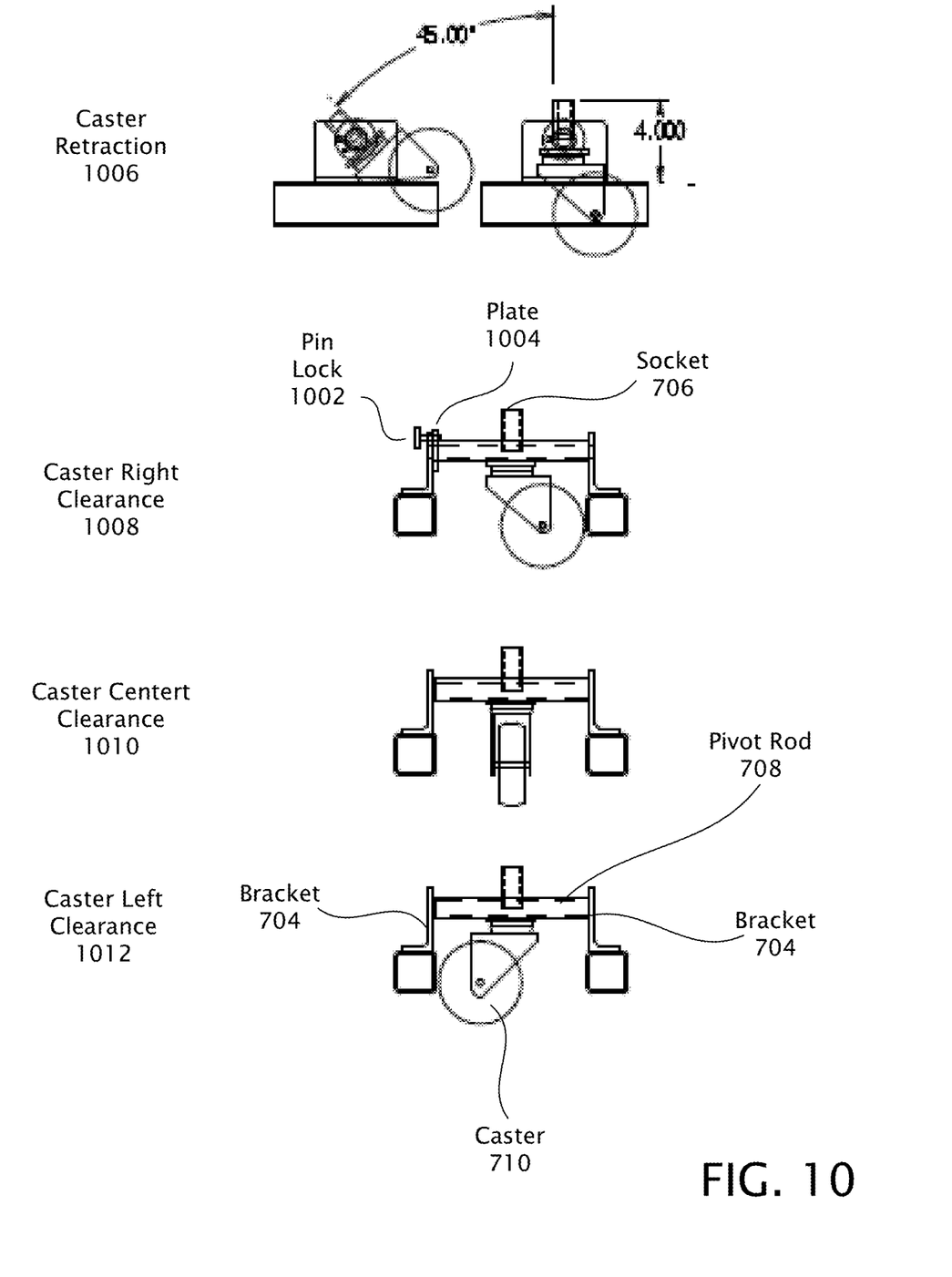
FIG. 10 is a detailed view of the wheels operation in the motorcycle carrier with retractable wheels of FIGS. 8 and 9.

FIG. 10 is a detailed view of the wheels operation in the motorcycle carrier with retractable wheels of FIGS. 8 and 9. As can be seen the wheels fold to the side when retracted, and may be extended by a lever in this example until an internal detent or other locking mechanism known to those skilled in the art is engaged.

A lever linearly coupled to the socket 706 may be used to rotate the casters between a raised and lowered position. A plate 1004 may be fixedly coupled to the pivot rod 708 with one or more apertures, and in particular an aperture corresponding to a fully extended wheel position. A conventionally constructed pin lock 1002 in a mounting bracket 704 may be inserted into the plate 1004 aperture to lock the wheel in place when it is extended.

In alternative examples the wheels may crank down utilizing a typical crank mechanism that allows the height to be adjusted, and holds the position of the wheels at a desired height. Alternatively the wheels may be extended to a fixed position, as may be desired. Also the wheels may be individually extended down. Alternatively one or more wheels may have their lowering and retracting mechanisms mechanically coupled so that one mechanism may control the raising or lowering of more than one wheel. The wheels themselves are typically wheels of sufficient size to roll easily.

The wheels themselves are typically of a caster type, or equivalent so that the carrier may be pushed in any direction desired. The rolling feature is advantageous when using the carrier in tow trucks, repair shops, or the like. Three or more wheels as desired may be used. Also position of the wheels may be varied as desired. For example for carriers pushed up ramps the wheels may be positioned at the front and back to keep the rack frame from hanging up on the ramp as the carrier transitions from being pushed across a flat floor to up a ramp and into a truck. Also the wheel height may be adjusted for such situations.

The carrier may also be enclosed or fitted with a rigid cover to protect the motorcycle from dirt, moisture, damage or the like during transport or storage.

Figure 11:
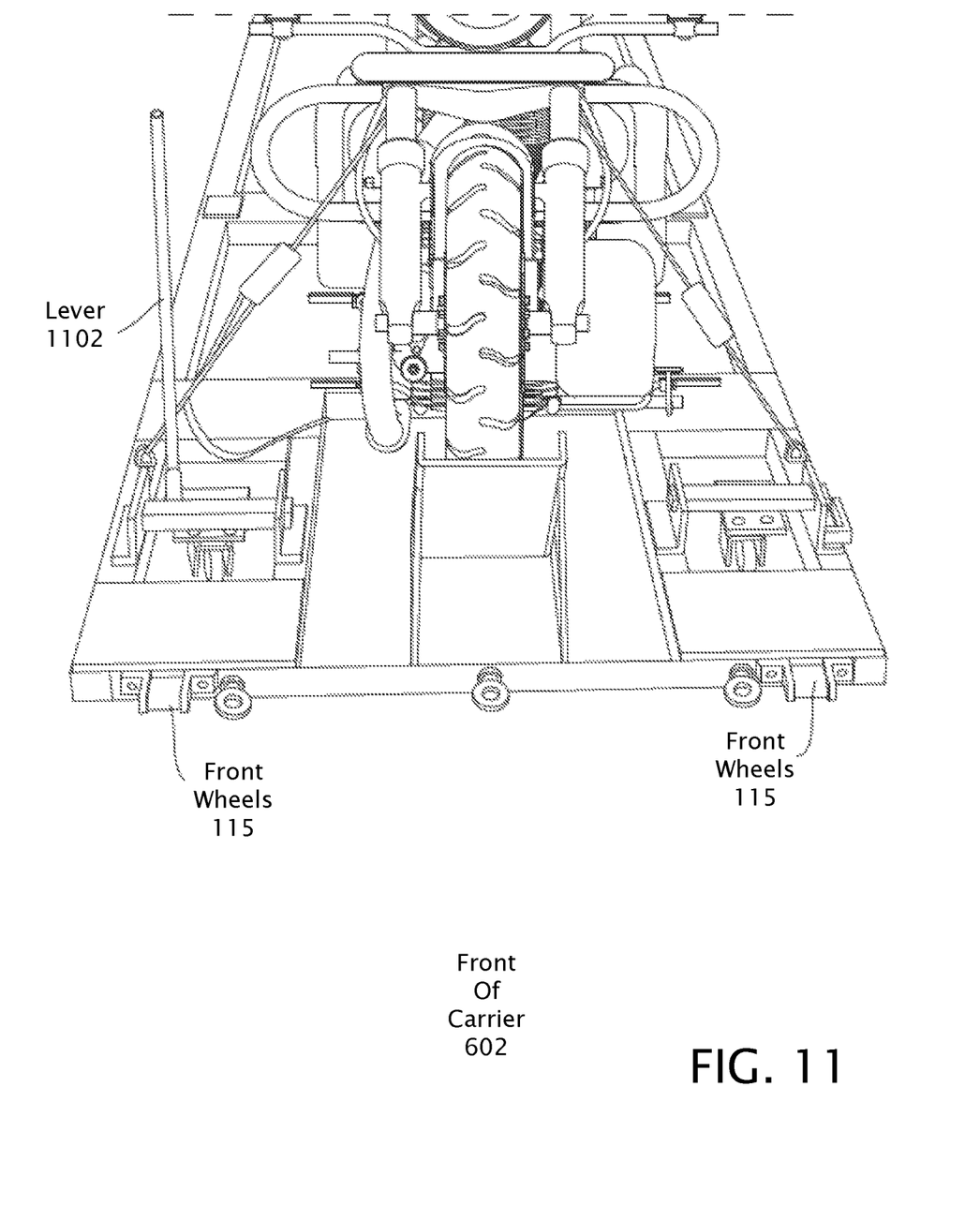
FIG. 11 shows a front view of the carrier with a motorcycle mounted on the carrier, and shows the lever as used to raise and lower the wheels on the carrier.

FIG. 11 shows a front view of the carrier with a motorcycle mounted on the carrier, and shows the lever 1102 as used to raise and lower the wheels on the carrier. Here through mechanisms known to those skilled in the art the lever causes the wheel to pivot about an axis, and then come to rest in one or more detents or other equivalent locking mechanism so that the wheels remain down and the motorcycle and carrier can be moved.

In further alternative examples the wheel retraction system may be configured by methods known to those skilled in the art to operate with just a foot, and doesn't involve bending over. In further alternative examples the carrier is constructed to separate into two or more pieces which can be stored on the tool boxes of tow vehicles and the like.

Those skilled in the art will realize that the process sequences described above may be equivalently performed in any order to achieve a desired result. Also, sub-processes may typically be omitted as desired without taking away from the overall functionality of the processes described above.

The invention claimed is:

1. A motorcycle carrier comprising:
a rigid rectangular frame including a rectangular perimeter formed from square aluminum tubing, and including a mid transverse brace bisecting a long side of the frame, and in each of a rectangular area formed by the bisection including a rear transverse brace and a front transverse base parallel to the mid transverse base, further disposing at each corner of the rectangular frame a wheel box member to form a wheel box at each corner of the frame;
a center channel attached to the frame and extending centrally along the length of the frame, the center channel including a hinged ramp at a first end and an inclined wheel stop at a second end, the center channel further including vertical side walls;
a pair of brackets disposed on each side of the wheel box, a bracket of the pair of brackets including a pin;
a rod rotabaly coupled to the brackets and including a socket;
a caster fixedly coupled to the rod;
a plate fixedly coupled to an end of the rod and including an aperture to accept the pin;
a first pair of wheels horizontally mounted to a front of the carrier frame; and
a second pair of wheels horizontally mounted to a rear of the carrier frame.

2. The motorcycle carrier of claim 1 in which each of the casters is individually operable by a removable lever insertable into the socket attached to the rod.

3. The motorcycle carrier of claim 1 in which the socket is positioned on the rod on a side opposite to the caster.

4. The motorcycle carrier of claim 1 in which the rectangular frame includes a plurality of eyelets for use in conjunction with tie down straps.

5. The motorcycle carrier of claim 4 in which each of the plurality of eyelets is coupled to the rigid rectangular frame adjacent a corner.

6. The motorcycle carrier of claim 1 in which the center channel is a rectangular trough with a flat bottom.

7. The motorcycle carrier of claim 1 in which the caster is operable by a lever.

8. The motorcycle carrier of claim 1 in which the caster is locked in place by a pin.

9. A motorcycle carrier comprising:
a rigid rectangular frame including a rectangular perimeter formed from square tubing, and including a mid transverse brace bisecting a long side of the frame, and in each of a rectangular area formed by the bisection including a rear transverse brace and a front transverse base parallel to the mid transverse base, further disposing at each corner of the rectangular frame a wheel box member to form a wheel box at each corner of the frame;
a center channel coupled to the frame and extending centrally along the length of the frame, the center channel including a hinged ramp at a first end and a wheel stop at a second end, the center channel further including vertical side walls;
a pair of brackets disposed on each side of the wheel box, a bracket of the pair of brackets including a pin lock;
a rod rotabaly coupled to each bracket of the pair of brackets;
a caster fixedly coupled to the rod;
a plate fixedly coupled to an end of the rod and including an aperture to accept a pin of the pin lock;
a first pair of wheels horizontally mounted to a front of the carrier frame; and
a second pair of wheels horizontally mounted to a rear of the carrier frame.

10. The motorcycle carrier of claim 9 in which the tubing is aluminum.

11. The motorcycle carrier of claim 9 in which a spring pushes the pin into the mounting bracket aperture.

12. The motorcycle carrier of claim 9 further comprising a lever coupled to the rod opposite to the wheel.

13. A motorcycle carrier comprising:
a rigid rectangular frame including a rectangular perimeter formed from square tubing, and including a mid transverse brace bisecting a long side of the frame, and in each of a rectangular area formed by the bisection including a rear transverse brace and a front transverse base parallel to the mid transverse base, further disposing at each corner of the rectangular frame a wheel box member to form a wheel box at each corner of the frame;
a center channel attached to the frame and extending centrally along the length of the frame, the center channel including a hinged ramp at a first end and an inclined wheel stop at a second end, the center channel further including vertical side walls;
a pair of brackets disposed on each side of the wheel box, a bracket of the pair of brackets including a pin;
a rod rotabaly coupled to the brackets and including a socket;
a caster fixedly coupled to the rod;
a plate fixedly coupled to an end of the rod and including an aperture to accept the pin;
a first pair of rollers horizontally mounted to a front of the carrier frame; and
a second pair of rollers horizontally mounted to a rear of the carrier frame.

14. The motorcycle carrier of claim 13 in which the tubing is aluminum.

15. The motorcycle carrier of claim 13 in which the rectangular perimeter is approximately 40 inches wide and 96 inches long.

16. The motorcycle carrier of claim 13 in a front of the motorcycle carrier includes at least one tow hook.

* * * * *